(12) United States Patent
Yegani et al.

(10) Patent No.: US 9,130,759 B2
(45) Date of Patent: Sep. 8, 2015

(54) CAPABILITY EXCHANGE DURING AN AUTHENTICATION PROCESS FOR AN ACCESS TERMINAL

(75) Inventors: Parviz Yegani, Danville, CA (US); Jayaraman Iyer, Sunnyvale, CA (US); Venkateshwara Sastry, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 392 days.

(21) Appl. No.: 11/714,413

(22) Filed: Mar. 6, 2007

(65) Prior Publication Data

US 2007/0208855 A1 Sep. 6, 2007

Related U.S. Application Data

(60) Provisional application No. 60/780,176, filed on Mar. 6, 2006.

(51) Int. Cl.
*G06F 15/173* (2006.01)
*H04L 12/14* (2006.01)
(Continued)

(52) U.S. Cl.
CPC ............. *H04L 12/14* (2013.01); *G06Q 20/102* (2013.01); *H04L 12/1403* (2013.01); *H04L 12/5695* (2013.01); *H04L 41/0893* (2013.01); *H04L 45/50* (2013.01); *H04L 47/10* (2013.01); (Continued)

(58) Field of Classification Search
CPC ....... H04L 67/141; H04L 69/24; H04L 63/08; H04L 63/0892; H05L 65/1069
USPC ........................................................ 709/225
See application file for complete search history.

(56) References Cited

U.S. PATENT DOCUMENTS 4,270,103 A 5/1981 Schroder
5,621,894 A * 4/1997 Menezes et al. .............. 709/227
(Continued)

FOREIGN PATENT DOCUMENTS

CN 1402451 A 3/2003
CN 1507173 A 6/2004
(Continued)

OTHER PUBLICATIONS

B. Adoba, et al. "Extensible Authentication Protocol (EAP)", Jun. 2004, Network Working Group Request for Comments: 3748. pp. 1-67.*

(Continued)

*Primary Examiner* — Jonathan Bui
(74) *Attorney, Agent, or Firm* — Patent Capital Group

(57) ABSTRACT

In one embodiment, during an authentication process between a network device and an access terminal, an authentication message for access to the network is received. The network device is configured to allow access to an IP network. The network device determines one or more capabilities of the access terminal from the authentication message. An action is then performed based on the one or more capabilities of the access terminal. The action may include using the capabilities to set up a session with the access terminal. Also, the network device may send its own capabilities to the access terminal in an authentication response. Accordingly, a capability negotiation between the access terminal and network device may be provided during an authentication process. This may facilitate a faster session setup as capabilities are exchanged during authentication can be used in the configuration of the session.

16 Claims, 4 Drawing Sheets

(51) Int. Cl.

| | |
|---|---|
| *G06Q 20/10* | (2012.01) |
| *H04L 12/54* | (2013.01) |
| *H04L 12/24* | (2006.01) |
| *H04L 12/723* | (2013.01) |
| *H04L 12/801* | (2013.01) |
| *H04L 12/913* | (2013.01) |
| *H04L 12/927* | (2013.01) |
| *H04L 12/911* | (2013.01) |
| *H04L 29/12* | (2006.01) |
| *H04L 29/06* | (2006.01) |
| *H04W 12/08* | (2009.01) |
| *H04W 36/00* | (2009.01) |
| *H04W 36/12* | (2009.01) |
| *H04W 8/26* | (2009.01) |
| *H04W 28/18* | (2009.01) |
| *H04W 36/14* | (2009.01) |
| *H04W 48/14* | (2009.01) |
| *H04W 60/00* | (2009.01) |
| *H04W 80/04* | (2009.01) |
| *H04W 80/10* | (2009.01) |
| *H04W 92/02* | (2009.01) |

(52) U.S. Cl.
CPC .............. *H04L47/14* (2013.01); *H04L 47/15* (2013.01); *H04L 47/724* (2013.01); *H04L 47/805* (2013.01); *H04L 47/824* (2013.01); *H04L 61/2015* (2013.01); *H04L 63/0892* (2013.01); *H04L 63/102* (2013.01); *H04L 63/162* (2013.01); *H04L 65/1006* (2013.01); *H04L 65/1016* (2013.01); *H04L 69/14* (2013.01); *H04L 69/24* (2013.01); *H04W 12/08* (2013.01); *H04W 36/0033* (2013.01); *H04W 36/12* (2013.01); *H04L 41/5029* (2013.01); *H04L 41/5061* (2013.01); *H04W 8/26* (2013.01); *H04W 28/18* (2013.01); *H04W 36/14* (2013.01); *H04W 48/14* (2013.01); *H04W 60/00* (2013.01); *H04W 80/04* (2013.01); *H04W 80/10* (2013.01); *H04W 92/02* (2013.01)

(56) References Cited

U.S. PATENT DOCUMENTS

| | | | | |
|---|---|---|---|---|
| 5,901,352 | A | 5/1999 | St-Pierre et al. | |
| 6,122,127 | A | 9/2000 | Flinsbaugh | |
| 6,332,153 | B1 | 12/2001 | Cohen | |
| 6,341,046 | B1 | 1/2002 | Peterson | |
| 6,420,910 | B1 | 7/2002 | Contreras | |
| 6,434,159 | B1* | 8/2002 | Woodward et al. | 370/401 |
| 6,791,957 | B2 | 9/2004 | Kim | |
| 6,981,047 | B2 | 12/2005 | Hanson et al. | |
| 6,989,856 | B2 | 1/2006 | Firestone et al. | |
| 6,990,086 | B1 | 1/2006 | Holur et al. | |
| 7,039,027 | B2 | 5/2006 | Bridgelall | |
| 7,054,268 | B1 | 5/2006 | Parantainen et al. | |
| 7,151,758 | B2 | 12/2006 | Kumaki et al. | |
| 7,177,624 | B2* | 2/2007 | Sivanandan et al. | 455/410 |
| 7,266,091 | B2 | 9/2007 | Singh et al. | |
| 7,266,611 | B2* | 9/2007 | Jabri et al. | 709/231 |
| 7,333,451 | B1 | 2/2008 | Khalil et al. | |
| 7,382,748 | B1 | 6/2008 | Bharatia et al. | |
| 7,421,732 | B2* | 9/2008 | Costa-Requena et al. | 726/3 |
| 7,477,657 | B1 | 1/2009 | Murphy et al. | |
| 7,545,761 | B1 | 6/2009 | Kalbag | |
| 7,657,259 | B2 | 2/2010 | Yegani et al. | |
| 7,675,704 | B2 | 3/2010 | Dean | |
| 7,751,830 | B2 | 7/2010 | Iyer | |
| 7,831,996 | B2* | 11/2010 | Dholakia et al. | 726/2 |
| 7,864,693 | B2* | 1/2011 | Burman et al. | 370/252 |
| 2002/0045450 | A1 | 4/2002 | Shimizu et al. | |
| 2002/0070801 | A1 | 6/2002 | Ferianz | |
| 2002/0105922 | A1 | 8/2002 | Jabbari et al. | |
| 2002/0110104 | A1 | 8/2002 | Surdila et al. | |
| 2002/0126626 | A1 | 9/2002 | Singh | |
| 2002/0196737 | A1 | 12/2002 | Bullard | |
| 2003/0142650 | A1 | 7/2003 | Fan | |
| 2003/0182431 | A1* | 9/2003 | Sturniolo et al. | 709/227 |
| 2003/0226017 | A1* | 12/2003 | Palekar et al. | 713/168 |
| 2003/0234685 | A1 | 12/2003 | Ranmuthu | |
| 2004/0009770 | A1* | 1/2004 | Sivanandan et al. | 455/425 |
| 2004/0034708 | A1* | 2/2004 | Pelletier et al. | 709/227 |
| 2004/0085667 | A1 | 5/2004 | Chung et al. | |
| 2004/0127258 | A1 | 7/2004 | Taketsugu | |
| 2004/0225878 | A1* | 11/2004 | Costa-Requena et al. | 713/150 |
| 2004/0246962 | A1 | 12/2004 | Kopeikin et al. | |
| 2004/0260796 | A1 | 12/2004 | Sundqvist et al. | |
| 2005/0007954 | A1 | 1/2005 | Sreemanthula et al. | |
| 2005/0009516 | A1 | 1/2005 | Stumpert et al. | |
| 2005/0050246 | A1 | 3/2005 | Lakkakorpi et al. | |
| 2005/0076114 | A1* | 4/2005 | Cook | 709/224 |
| 2005/0078824 | A1* | 4/2005 | Malinen et al. | 380/247 |
| 2005/0088203 | A1 | 4/2005 | Price, Jr. | |
| 2005/0091539 | A1* | 4/2005 | Wang et al. | 713/201 |
| 2005/0099492 | A1 | 5/2005 | Orr | |
| 2005/0120213 | A1* | 6/2005 | Winget et al. | 713/171 |
| 2005/0128956 | A1* | 6/2005 | Hsu et al. | 370/252 |
| 2005/0136949 | A1* | 6/2005 | Barnes, Jr. | 455/461 |
| 2005/0162221 | A1 | 7/2005 | Barnett et al. | |
| 2005/0174669 | A1 | 8/2005 | Contreras et al. | |
| 2005/0180041 | A1 | 8/2005 | Kajiyama et al. | |
| 2005/0265276 | A1 | 12/2005 | Takeda et al. | |
| 2005/0271013 | A1* | 12/2005 | Shaheen | 370/331 |
| 2006/0002426 | A1* | 1/2006 | Madour | 370/477 |
| 2006/0002557 | A1* | 1/2006 | Madour | 380/270 |
| 2006/0007862 | A1 | 1/2006 | Sayeedi et al. | |
| 2006/0026671 | A1* | 2/2006 | Potter et al. | 726/7 |
| 2006/0028986 | A1* | 2/2006 | Kwon et al. | 370/230 |
| 2006/0067271 | A1 | 3/2006 | Chen et al. | |
| 2006/0070111 | A1* | 3/2006 | Kurosawa | 725/105 |
| 2006/0095943 | A1 | 5/2006 | Demircin et al. | |
| 2006/0104297 | A1 | 5/2006 | Buyukkoc et al. | |
| 2006/0133420 | A1* | 6/2006 | Chung et al. | 370/469 |
| 2006/0142008 | A1 | 6/2006 | Lee et al. | |
| 2006/0193272 | A1 | 8/2006 | Chou et al. | |
| 2006/0217112 | A1 | 9/2006 | Mo | |
| 2006/0251038 | A1 | 11/2006 | Tamura et al. | |
| 2006/0264207 | A1 | 11/2006 | Tamura et al. | |
| 2006/0268845 | A1 | 11/2006 | He et al. | |
| 2007/0014259 | A1 | 1/2007 | Fajardo et al. | |
| 2007/0019621 | A1 | 1/2007 | Perry et al. | |
| 2007/0060097 | A1* | 3/2007 | Edge et al. | 455/404.1 |
| 2007/0083470 | A1* | 4/2007 | Bonner et al. | 705/51 |
| 2007/0162751 | A1* | 7/2007 | Braskich et al. | 713/169 |
| 2007/0183440 | A1* | 8/2007 | Bennet et al. | 370/419 |
| 2007/0206556 | A1 | 9/2007 | Yegani | |
| 2007/0213097 | A1 | 9/2007 | Taketsugu | |
| 2007/0217406 | A1 | 9/2007 | Riedel et al. | |
| 2007/0242638 | A1* | 10/2007 | Arkko et al. | 370/331 |
| 2007/0248078 | A1 | 10/2007 | Gundavelli | |
| 2007/0249334 | A1 | 10/2007 | Oswal et al. | |
| 2007/0281743 | A1 | 12/2007 | Palin et al. | |
| 2008/0043618 | A1 | 2/2008 | Iyer | |
| 2008/0212503 | A1* | 9/2008 | Lipford et al. | 370/310 |
| 2008/0259881 | A1* | 10/2008 | Hancock et al. | 370/338 |
| 2008/0287104 | A1* | 11/2008 | Sundberg et al. | 455/412.1 |
| 2009/0163207 | A1 | 6/2009 | Randall et al. | |
| 2009/0217357 | A1* | 8/2009 | Dell'Uomo et al. | 726/5 |

FOREIGN PATENT DOCUMENTS

| | | |
|---|---|---|
| CN | 101385316 | 3/2009 |
| CN | 101438344 A | 5/2009 |
| EP | 1075123 | 2/2001 |
| EP | 1994725 | 8/2007 |
| EP | 1997325 | 12/2008 |
| EP | 1997105 | 6/2010 |
| EP | 1429567 | 2/2012 |
| WO | WO 03/063441 | 7/2003 |
| WO | WO 03/084096 | 10/2003 |
| WO | WO 2004/004378 | 1/2004 |

(56) References Cited

FOREIGN PATENT DOCUMENTS

| WO | WO 2006/007574 | 1/2006 |
|---|---|---|
| WO | WO 2007/098165 | 8/2007 |
| WO | WO 2007/104050 | 8/2007 |
| WO | WO 2007/098245 | 8/2008 |

OTHER PUBLICATIONS cdma2000 Wireless IP Network Standard: Introduction, 33 pages, 3rd Generation Partnership, Project 2 "3GPP2" 3GPP2 X.S0011-001-D, Version: 1.0, Version Date: Feb. 2006.

cdma2000 Wireless IP Network Standard: Simple IP and Mobile IP Access Services, 94 pages, 3rd Generation Partnership, Project 2 "3GPP2", 3GPP2 X.S0011-002-D, Version: 1.0, Version Date: Feb. 2006.

cdma2000 Wireless IP Network Standard: Data Mobility and Resource Management, 37 pages, 3rd Generation Partnership, Project 2 "3GPP2", 3GPP2 X.S0011-003-D, Version: 1.0, Version Date: Feb. 2006.

cdma2000 Wireless IP Network Standard: Accounting Services and 3GPP2 RADIUS VSAs, 75 pages, 3rd Generation Partnership, Project 2 "3GPP2", 3GPP2 X.S0011-005-D, Version: 1.0, Version Date: Feb. 2006.

cdma2000 Wireless IP Network Standard: PrePaid Packet Data Service, 37 pages, 3rd Generation Partnership, Project 2 "3GPP2", 3GPP2 X.S0011-006-D, Version: 1.0, Version Date: Feb. 2006.

cdma2000 Wireless IP Network Standard: Quality of Service and Header Reduction, 72 pages, 3rd Generation Partnership, Project 2 "3GPP2", 3GPP2 X.S0011-004-D, Version: 1.0, Version Date: Feb. 2006.

Aug. 2, 2011 Response to PRC Second Office Action from State Intellectual Property Office from Chinese Application 200780005907.5 [English translation of pending claims only]; 11 pages.

PRC Jun. 30, 2011 Third Office Action mailed from the State Intellectual Property Office of the People's Republic of China from Chinese Application No. 200780005846.2; 7 pages.

Sep. 15, 2011 Response to PRC Third Office Action from State Intellectual Property Office from Chinese Application 200780005846.2 [English translation of pending claims only]; 10 pages.

"3GPP2," 3rd Generation Partnership Project 2, cdma2000 Wireless IP Network Standard: Introduction, Version 1.0, Feb. 2006, 3GPP2 X.S0011-004-D.

EPO Supplementary European Search Report and Search Opinion mailed Dec. 3, 2009 for Application No. 07758263.3; 6 pages.

PCT International Search Report mailed Jun. 12, 2008 for PCT/US07/04617; 2 pages.

PCT International Preliminary Report on Patentability and Written Opinion of the International Searching Authority mailed Aug. 19, 2008 for PCT/US07/04617; 8 pages.

PCT International Search Report mailed Feb. 7, 2008 for PCT/US07/63692; 1 page.

PCT International Preliminary Report on Patentability and Written Opinion of the International Searching Authority mailed Sep. 9, 2008 for PCT/US07/63692; 4 pages.

PCT International Search Report mailed Jul. 28, 2008 for PCT/US07/004415; 1 page.

PCT International Preliminary Report on Patentability and Written Opinion of the International Searching Authority mailed Sep. 9, 2008 for PCT/US07/004415; 4 pages.

PCT International Search Report mailed Jun. 5, 2008 for PCT/US08/55405; 1 page.

PCT International Preliminary Report on Patentability and Written Opinion of the International Searching Authority mailed Sep. 8, 2008 for PCT/US08/55405; 6 pages.

Perkins, C., "IP Mobility Support for IPv4," Network Working Group RFC 3344; Aug. 2002, http://rft.sunsite.dk/rfc/rfc3344.htl, 99 pages.

PRC First Office Action mailed Nov. 18, 2010 from the State Intellectual Property Office of the People's Republic of China from application CN 200780005907.5; 17 pages.

Response dated Apr. 1, 2011 to PRC First Office Action from the State Intellectual Property Office of the People's Republic of China mailed Nov. 18, 2010 from application CN 200780005907.5; 14 pages.

PRC First Office Action mailed Nov. 12, 2009 from the State Intellectual Property Office of the People's Republic of China from application CN 200780005846.2; 23 pages.

Response dated Apr. 6, 2010 to PRC First Office Action from the State Intellectual Property Office of the People's Republic of China mailed Nov. 12, 2009 from application CN 200780005846.2; 31 pages.

PRC Second Office Action mailed May 24, 2010 from the State Intellectual Property Office of the People's Republic of China from application CN 200780005846.2; 13 pages.

Response dated Aug. 9, 2010 to PRC Second Office Action from the State Intellectual Property Office of the People's Republic of China mailed May 24, 2010 from application CN 200780005846.2; 9 pages.

Yegani, P. et al., "GRE Key Extension for Mobile IPv4," Network Working Group, Aug. 5, 2006, 9 pages.

Ylitalo, et al., "Re-thinking Security in IP based Micro-Mobility," [Retrieved and printed May 5, 2011]www.tcs.hut.fi/Studies/T-79.5401/2005AUT/ISCO4-Viitalo-e-al.pdf; 12 pages.

Mar. 18, 2011 USPTO Final Rejection from U.S. Appl. No. 11/714,566.

Jun. 20, 2011 Response to USPTO Final Rejection from U.S. Appl. No. 11/714,566.

PRC May 18, 2011 Second Office Action from the State Intellectual Property Office of the People's Republic of China from CN Application 200780005907.5 [English translation only, Chinese version not available]; 7 pages.

Pham, Tung Thanh et al., "An Introduction to Radio Resource Management in Cellular Systems," 8 pages [retrieved and printed Jun. 15, 2011] http://www.item.ntnu.no/fii/cac_tung.pdf.

EPO Jan. 19, 2012 Supplementary European Search Report and Written Opinion from Application EP07751189; 5 pages.

EPO Feb. 6, 2012 Supplementary European Search Report and Written Opinion from Application EP07751384; 8 pages.

PRC Oct. 19, 2011 Fourth Office Action mailed from the State Intellectual Property Office of the People's Republic of China from Chinese Application No. 200780005846.2; 7 pages.

Jan. 4, 2012 Response to PRC Fourth Office Action from State Intellectual Property Office from Chines Application 200780005846.2; 10 pages [English translation of Claims only].

EPO Jun. 13, 2012 Response to Communication from European Application No. 07751384.4; 10 pages.

EPO Aug. 9, 2012 Response to Feb. 7, 2012 Communication regarding Written Opinion from European Application No. 07751189.7.

EPO Oct. 1, 2012 Communication from European Application No. 07751384; 4 pages.

USPTO Oct. 23, 2012 Notice of Allowance from U.S. Appl. No. 11/707,747.

U.S. Appl. No. 13/692,320, filed Dec. 3, 2012 entitled "Decoupling Radio Resource Management from an Access Gateway," Inventor(s): Anand K. Oswal, et al.

USPTO Apr. 24, 2013 Notice of Allowance from U.S. Appl. No. 13/692,320.

EPO Jul. 9, 2014 Communication from European Application Serial No. 07751189.7.

Kulkarni, Miland, et al., "Mobile IPv4 Dynamic Home Agent Assignment," Mobile IP Working Group Internet Draft draft-ietf-mip4-dynamic-assignment-07.txt; Dec. 12, 2005, 24 pages.

\* cited by examiner

CAPABILITY EXCHANGE DURING AN AUTHENTICATION PROCESS FOR AN ACCESS TERMINAL

CROSS REFERENCES TO RELATED APPLICATIONS

This application claims priority from U.S. Provisional Patent application Ser. No. 60/780,176 filed on Mar. 6, 2006, which is hereby incorporated by reference in their entirety for all purposes.

TECHNICAL FIELD

Particular embodiments generally relate to networking.

BACKGROUND

In a code division multiplex access (CDMA) packet data network, an access terminal may be authenticated with a network for access. After authentication, a point-to-point (PPP) link may be brought up using the PPP protocol and extensions. The capabilities of the access terminal may then be exchanged with the network through the PPP link. Exchanging capabilities after authentication through the PPP link may delay the call setup. Further, for other protocols that may not use a PPP link, the procedures to exchange capabilities using the PPP link do not apply.

DESCRIPTION OF EXAMPLE EMBODIMENTS

Overview

In one embodiment, during an authentication process between a network device and an access terminal, an authentication message for access to the network is received. The network device is configured to allow access to an IP network. For example, the access terminal may be requesting access using mobile internet protocol (mobile IP). The network device determines one or more capabilities of the access terminal from the authentication message. For example, the capabilities may be included in fields of the authentication message. An action is then performed based on the one or more capabilities of the access terminal. The action may include using the capabilities to set up a session with the access terminal. Also, the network device may send its own capabilities to the access terminal in an authentication response. Accordingly, a capability negotiation between the access terminal and network device may be provided during an authentication process. This may facilitate a faster session setup as capabilities are exchanged during authentication can be used in the configuration of the session.

Example Embodiments

Figure 1:
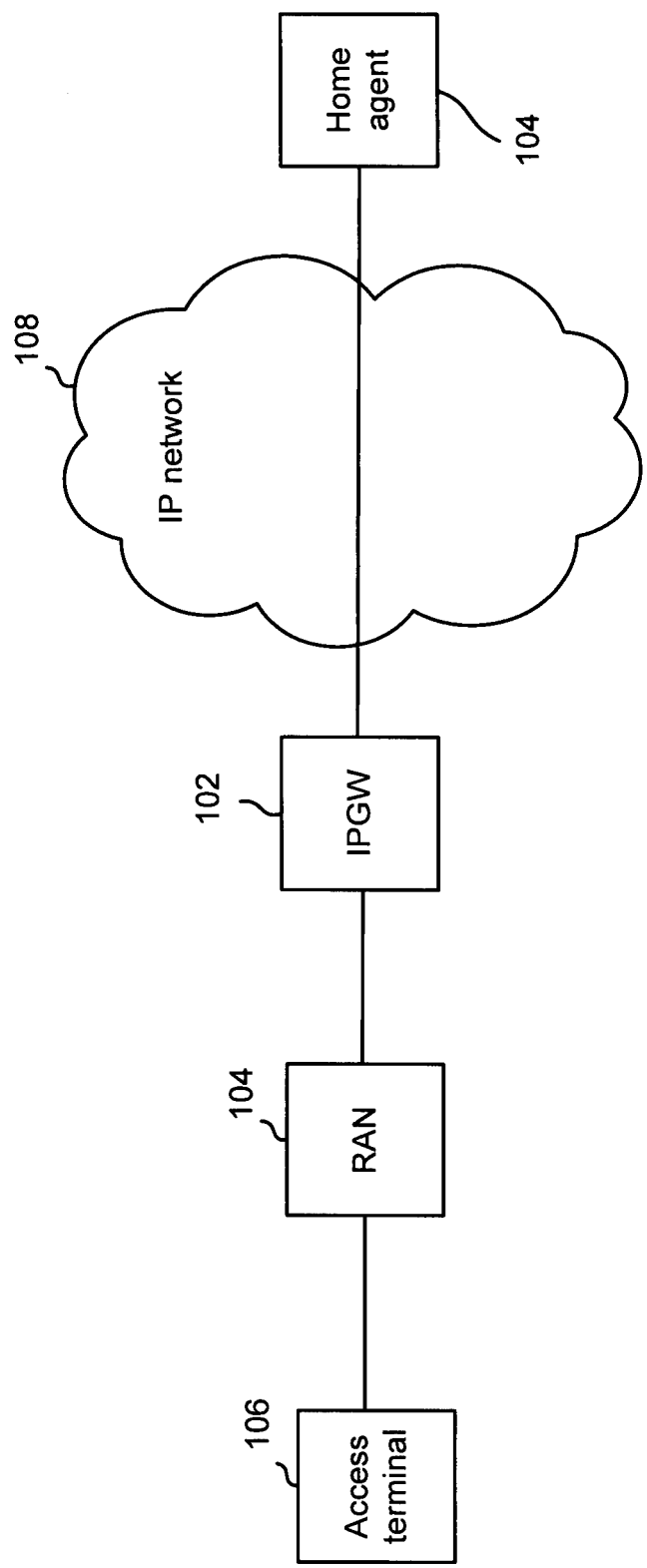
FIG. 1 shows an example of a system for providing a capability exchange.

FIG. 1 shows an example of a system for providing a capability exchange. As shown, the system includes an IP gateway (IPGW) 102, radio access network (RAN) 104, an access terminal 106, an IP network 108, and a home agent 110.

The system described may use a mobile IP network in which access terminal 106 is attempting to access its home network through a visiting network. However, other protocols may be used in accessing different networks, such as access to a wireless fidelity (WiFi) network may be provided by particular embodiments.

IP gateway 102 is configured to provide the access to the home network for access terminal 106. Packets may be sent through IP network 108. Although a mobile IP network is described, it will be understood that other networks may also be used, such as worldwide interoperability for microwave access (WiMAX), CDMA, WiFi, etc.

IP gateway 102 may be any network device configured to facilitate authentication. Although an IP gateway is described, IP gateway 102 may also be a router, switch, back-to-back user agent, etc.

Radio access network 104 may be part of a mobile telecommunications system. Radio access network 104 may implement a radio access technology, such as CDMA, global system for mobile communications (GSM), universal mobile telecommunications system (UMTS), WiMAX, etc.

Access terminal 106 may be an endpoint, such as a cellular telephone, mobile e-mail device, laptop computer, personal digital assistant (PDA), instant messaging client, etc. Although access terminal 106 may be a mobile node, it will be understood that access terminal 106 may include a fixed device also.

Access terminal 106 may connect wirelessly to radio access network 104. Radio access network 104 may include a base station and other components that enable layer 2 mobile access and over-the-air communication. In other embodiments, access terminal 106 may also connect through a wired network.

Home agent 110 may be found in a home network. The home network may be a permanent home network that is assigned to access terminal 106. For example, the home network may have a network prefix matching that of a home address for access terminal 106. Home agent 110 facilitates messaging with access terminal 106 when it roams to visiting networks. In one embodiment, access terminal 106 must be authenticated by the home network when it wants to attach to a visiting network. This authentication process may be performed using protocols, such as extensible authentication protocol (EAP).

Particular embodiments provide a capabilities exchange during an authentication process for requesting access to the visiting network. In one embodiment, an access authentication request is sent from access terminal 106 to IP gateway 102 and requests access to the network. Access terminal 106 may determine one or more capabilities that it possesses and include information for the capabilities in the authentication message. Different access terminals 106 may include different capabilities. For example, a laptop computer, smart phone, regular voice phone, etc. may have different capabilities. Thus, IP gateway 102 cannot just assume which capabilities access terminal 106 supports. For example, access terminal 106 may be able to make a voice call, send data through an IP connection, listen to music, etc. Further, access terminal 106 may want to open a simple IP session, a mobile IP session, etc. Also, if access terminal 106 is using mobile IP, then access terminal 106 needs to let the network know through a mobile IP stack its capabilities. Thus, knowing the capabilities of access terminal 106 is important.

IP gateway 102 may also determine its own capabilities. These capabilities may be features supported by a network, such as which versions of protocols (IPv4, IPv6, etc.) are supported, etc. IP gateway 102 may authenticate access terminal 106 and may include its own capabilities in an authentication message response.

IP gateway 102 and access terminal 106 may use the capabilities that are exchanged to set up the session. Because the capabilities are exchanged during the authentication process, the set up of the session may be expedited. Conventionally, access terminal 106 may have been authenticated first and then a link is set up. Then capabilities may have been exchanged. However, in this case, capabilities are exchanged during the authentication process and the session may be set up using the capabilities that are exchanged. Accordingly, the session setup is more efficient because the capabilities may be used to configure the session with the correct capabilities supported.

Figure 2:
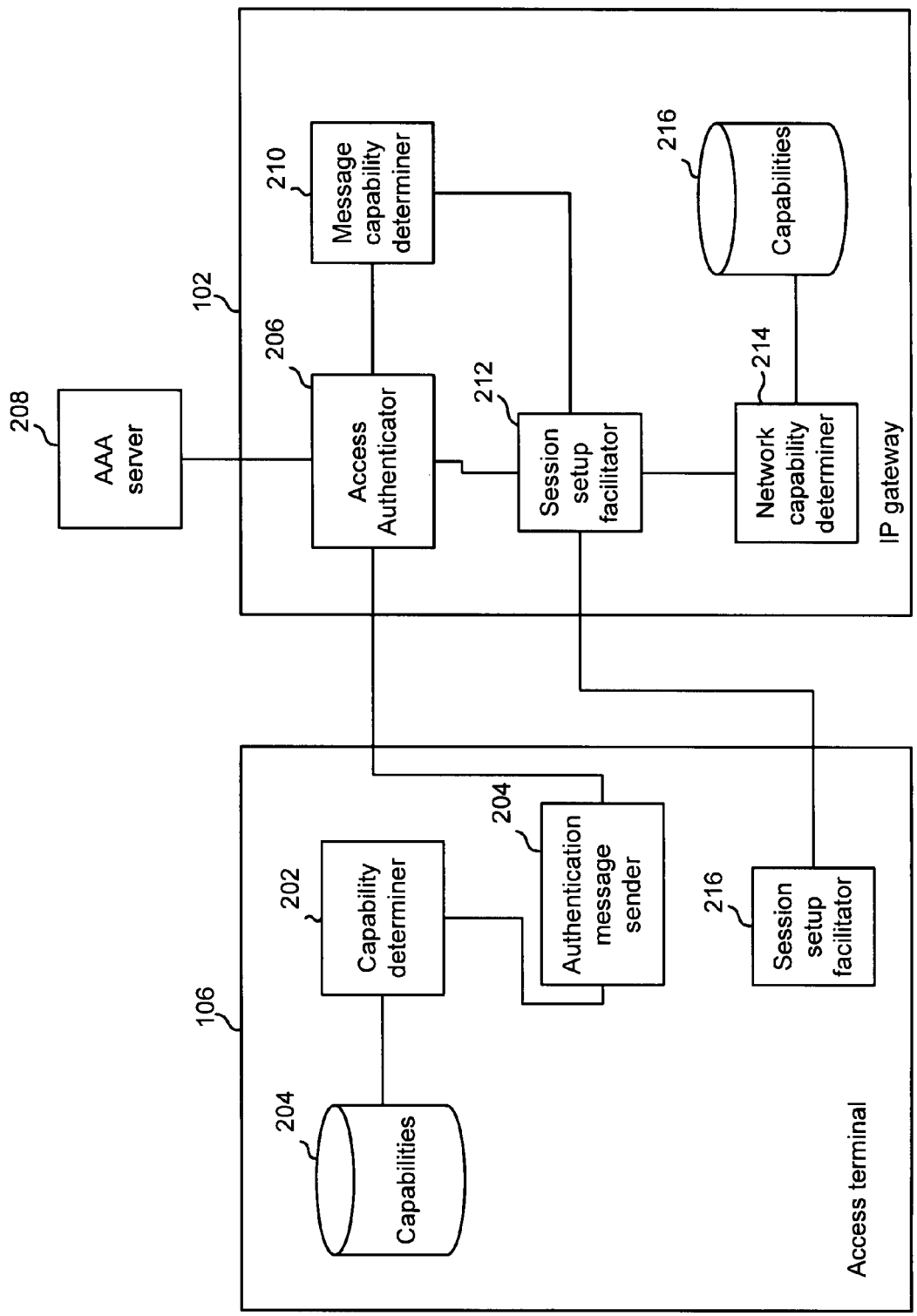
FIG. 2 depicts a more detailed example of an access terminal and an IP gateway.

FIG. 2 depicts a more detailed example of access terminal 106 and IP gateway 102. In access terminal 106, a capability determiner 202 determines capabilities for access terminal 106. The capabilities may be stored in storage 204. These capabilities may include any features that are supported by access terminal 106, such as its data capabilities, voice capabilities, codec type, resource revocation capability, robust header compression (ROHC), protocol version number, other protocol features supported, etc.

An authentication message sender 204 is then configured to generate an authentication message. For example, an EAP message requesting access to a network is generated. This message may be generated based on a request from IP gateway 102 or when access terminal 106 attaches to the visiting network.

The capabilities determined may be included in the authentication message as an extension to the protocol. For example, the authentication message may include fields in which information for the capabilities supported may be inserted.

Authentication message sender 204 then sends a message to IP gateway 102. The message may be sent over radio access network 104 to IP gateway 102. It should be noted that access terminal 106 might have been previously authenticated by radio access network 104 and thus it can communicate through the radio access network with IP gateway 102. This authentication process with radio access network 104 may be different from the authentication access process with the visiting network. For example, the access with IP gateway 102 is layer 3 access. Also, the capabilities may include layer 3 capabilities (IP and service layer attributes).

An access authenticator 206 of IP gateway 102 is configured to authenticate access terminal 106. For example, access authenticator 206 may communicate with a AAA server 208 that facilitates the authentication of access terminal 106. AAA server 208 may communicate with a home network of access terminal 106 to facilitate the authentication. The authentication of access terminal 106 is known in the art and will not be described further.

A message capability determiner 210 is configured to determine the capabilities that were included in the authentication message. Message capability determiner 210 may be configured to determine the capabilities from fields in the authentication request.

A session setup facilitator 212 is configured to set up the session. In one embodiment, if access authenticator 206 receives confirmation that access terminal 106 is authenticated to access a network, then capabilities for IP gateway 102 or the network may be determined.

A network capability determiner 214 may determine the capabilities from storage 216. These capabilities may include which protocols or features are supported by IP gateway 102. For example, IP gateway 102 may notify access terminal 106 that it supports proxy mobile IP (PMIP) and not client mobile IP (CMIP).

Session setup facilitator 212 then sends an authentication response to access terminal 106. For example, the authentication response may indicate whether or not access terminal 106 has been authenticated and may also include the capabilities for IP gateway 102 (e.g., capabilities of the network).

A session setup facilitator 216 of access terminal 106 is then configured to set up the session with session setup facilitator 212 of IP gateway 102. For example, access terminal 106 may take proper action based on the capabilities of the network before sending a request for IP access. In one example, if the capabilities for the network indicate PMIP is supported but not client mobile IP (CMIP), then PMIP may be used instead of CMIP. Having the capabilities exchange during the access authentication (via EAP) allows both access terminal 106 and IP gateway 102 to sync up quickly before access terminal 106 attempts to access the network.

Figure 3:
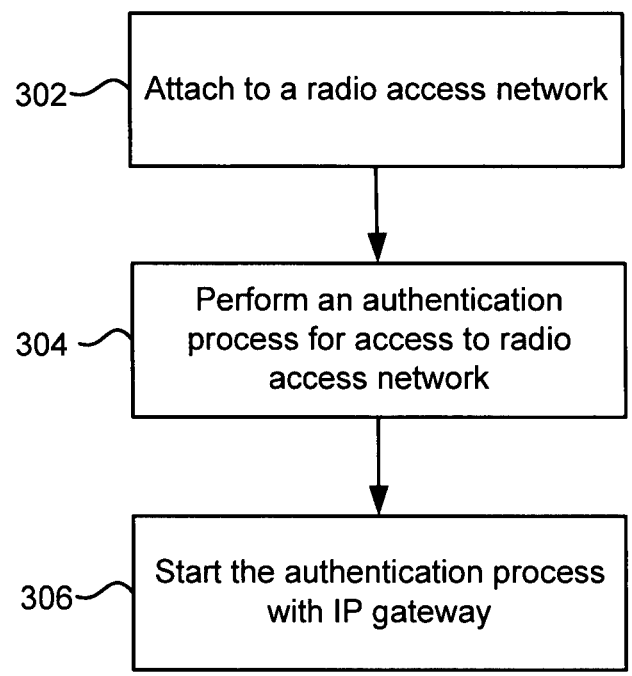
FIG. 3 depicts an example of a method for initiating the authentication process.

FIG. 3 depicts an example of a method for initiating the authentication process. Step 302 attaches to a radio access network. For example, access terminal 106 may be roaming and may attach to a visiting network. In one example, a base station may acquire access terminal 106.

Step 304 performs an authentication process for access to radio access network 104. This may involve exchanging layer two capabilities between access terminal 106 and radio access network 104.

Once access terminal 106 is authenticated to access radio access network 104, step 306 starts the authentication process with IP gateway 102.

Figure 4:
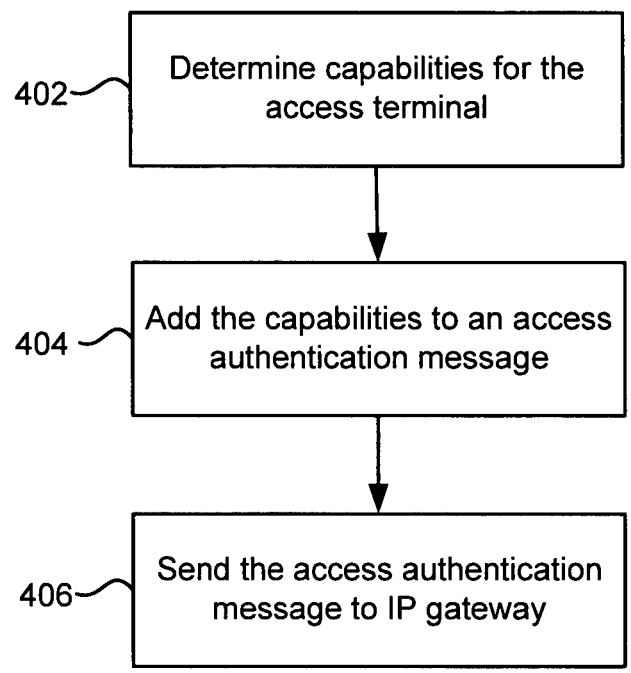
FIG. 4 depicts an example of a method for performing an authentication process at the access terminal.

FIG. 4 depicts an example of a method for performing an authentication process at access terminal 106. Step 402 determines capabilities for access terminal 106. These may be any capabilities that are supported by access terminal 106.

Step 404 adds the capabilities to an access authentication message. For example, the capabilities may be added to an extension to an EAP authentication message.

Step 406 sends the access authentication message to IP gateway 102.

Figure 5:
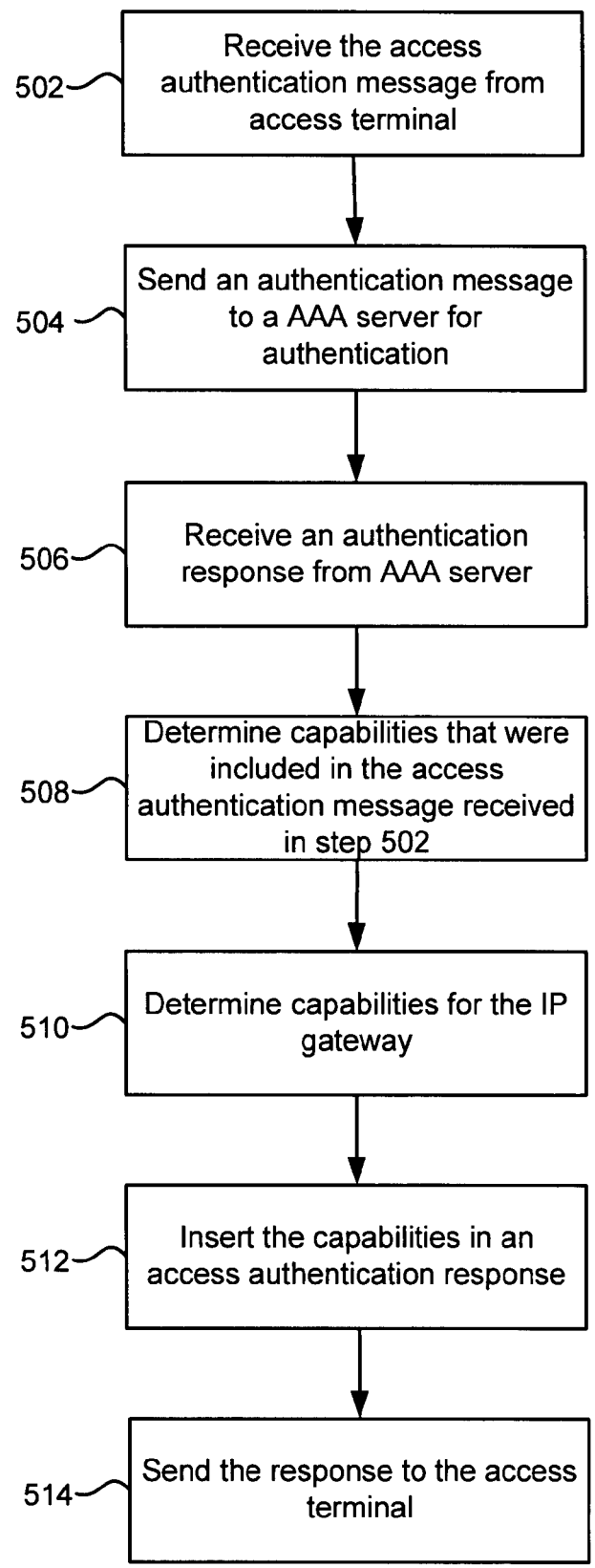
FIG. 5 depicts an example of a method for exchanging capabilities during an authentication process at the IP gateway.

FIG. 5 depicts an example of a method for exchanging capabilities during an authentication process at IP gateway 102. Step 502 receives the access authentication message from access terminal 106. Step 504 sends an authentication message to AAA server 208 for authentication. AAA server 208 may then perform an authentication, such as communicating with a AAA server in the home network for access terminal 106 to facilitate the authentication.

Step 506 receives an authentication response from AAA server 208. This may indicate whether or not access terminal 106 is authorized to access the visiting network or not.

Step 508 determines capabilities that were included in the access authentication message received in step 502. These capabilities may be used in the session setup for access terminal 106.

Step 510 determines capabilities for IP gateway 102. These may be capabilities associated with a network.

Step 512 inserts the capabilities in an access authentication response. Also, the access authentication response may indicate whether or not access terminal 106 has been authenticated or not and also includes the network capabilities.

Step 514 then sends the response to access terminal 106.

Once the capabilities have been exchanged in authentication messages, access terminal 106 and IP gateway 102 may then proceed to set up a session. The capabilities that have been exchanged may be used in setting up the session. For example, certain decisions on what kinds of sessions to set up may be determined based on the capabilities exchanged. This is different than just setting up a session without knowing the capabilities of either access terminal 106 or IP gateway 102. By exchanging capabilities, the sessions may be set up more efficiently as the features may be incorporated into the session setup automatically. This is different than exchanging capabilities after the session is set up and then having to reconfigure the capabilities of the session if the incorrect capabilities were configured for the session.

Accordingly, capabilities are exchanged before an access attempt for setting up a session with a network is performed. This becomes more advantageous as different access terminals can include a multitude of different capabilities. Thus, different kinds of sessions may need to be set up based on the different capabilities. Thus, it is more likely that session setup will be inefficient if the session needs to be set up before the capabilities are exchanged. Accordingly, particular embodiments allow sessions to be set up using the known capabilities for access terminal 106 and IP gateway 102.

Particular embodiments provide a common and access agnostic mechanism to exchange capabilities in the access segment between access terminal 106 and IP gateway 102. Gateways may be designed to implement the same functions via EAP across different access technologies. This simplifies the design of IP gateways and other devices that allow access to networks.

Although the description has been described with respect to particular embodiments thereof, these particular embodiments are merely illustrative, and not restrictive. Although mobile IP is described, particular embodiments may also be used with WiMAX, 3GPP2 involved architectures, IP radio access networks, 3GPP system architecture evolution (SAE)/long-term evolution (LTE), ATM-internet protocol multimedia subsystem (A-IMS), PPP free, etc Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
receiving at an Internet Protocol Gateway element ("IPG") disposed between an access terminal and an Internet protocol ("IP") network an authentication request from the access terminal, the authentication request comprising a request to access the network and an indication of access terminal capabilities, wherein the access terminal capabilities comprise at least one of a resource revocation capability, and robust header compression (ROHC) capabilities;
sending an authentication response, in response to the authentication request, to the access terminal, the authentication response including network capabilities, the network capabilities including at least one type of Internet protocol supported by the network; and
configuring a session between the IPG and the access terminal using the access terminal capabilities and the network capabilities;
wherein the authentication request and the authentication response comprise extensible authentication protocol (EAP) messages.

2. The method of claim 1, further comprising authenticating the access terminal before sending the authentication response.

3. The method of claim 1, wherein at least one of the access terminal capabilities and the network capabilities comprise capabilities for layer 3 access.

4. A method comprising:
sending an authentication request to a network device, the authentication request comprising a request to access a network and an indication of access terminal capabilities, wherein the access terminal capabilities comprise at least one of a resource revocation capability, and robust header compression (ROHC) capabilities;
receiving an authentication response in response to the authentication request, including network capabilities supported by the network device, the network capabilities including at least one type of Internet protocol supported by the network; and
configuring a session between the network device and the access terminal using the access terminal capabilities and the network capabilities;
wherein the session is configured to support at least a part of the one or more first capabilities supported by the access terminal, wherein different first capabilities being supported by the access terminal result in different session configurations; and
wherein the authentication request and the authentication response comprise extensible authentication protocol (EAP) messages.

5. The method of claim 4, wherein the authentication request and the authentication response are exchanged prior to the configuration of the session.

6. The method of claim 4, wherein at least one of the access terminal capabilities and the network capabilities comprise capabilities for layer 3 access.

7. An apparatus comprising:
one or more computer processors; and
logic encoded in one or more non-transitory tangible storage media for execution by the one or more computer processors, and when executed operable to:
receive at an Internet Protocol Gateway element ("IPG") disposed between an access terminal and an Internet protocol ("IP") network an authentication request from the access terminal, the authentication request comprising a request to access the network and an indication of access terminal capabilities, wherein the access terminal capabilities comprise at least one of a resource revocation capability, and robust header compression (ROHC) capabilities;
send an authentication response, in response to the authentication request, to the access terminal, the authentication response including network capabilities, the network capabilities including at least one type of Internet protocol supported by the network; and
configure a session between the IPG and the access terminal using the access terminal capabilities and the network capabilities;
wherein the authentication request and the authentication response comprise extensible authentication protocol (EAP) messages.

8. The apparatus of claim 7, wherein the authentication request and the authentication response are exchanged prior to the set up of the session.

9. The apparatus of claim 7, wherein at least one of the access terminal capabilities and the network capabilities comprise capabilities for layer 3 access.

10. An apparatus comprising:
one or more computer processors; and
logic encoded in one or more non-transitory tangible storage media for execution by the one or more computer processors, and when executed operable to:
determine one or more access terminal capabilities supported by the apparatus, wherein the access terminal capabilities comprise at least one of a resource revocation capability, and robust header compression (ROHC) capabilities;

send an authentication request for access to an Internet protocol ("IP") network to a network device comprising an Internet Protocol Gateway element ("IPG") disposed between an access terminal and the network, wherein the access terminal capabilities are included in the authentication message; and receive an authentication response from a network device in response to the authentication request, the authentication response including network capabilities supported by the network device, the network capabilities including at least one type of Internet protocol supported by the network;

configure a session between the network device and the access terminal using the access terminal capabilities and the network capabilities;

wherein the session is configured to support at least a part of the one or more first capabilities supported by the access terminal, wherein different first capabilities being supported by the access terminal result in different session configurations; and wherein the authentication request and the authentication response comprise extensible authentication protocol (EAP) messages.

11. The apparatus of claim 10, wherein the authentication request and the authentication response are exchanged prior to the configuration of the session.

12. The apparatus of claim 10, wherein at least one of the access terminal capabilities and the network capabilities comprise capabilities for layer 3 access.

13. An apparatus comprising:

means for determining the one or more first capabilities of the an access terminal using the a first authentication message received at the apparatus requesting access to an Internet protocol ("IP") network during an authentication process with the access terminal, wherein information about the one or more first capabilities is included in the first authentication message, and wherein the one or more first capabilities comprise at least one of resource revocation capability, and robust header compression (ROHC) capabilities; and means for sending a second authentication message, in response to the first authentication message, to the access terminal, the second authentication message including information about one or more second capabilities supported by the apparatus, the second capabilities including at least one type of Internet protocol supported by the network;

wherein a session between the access terminal and the apparatus is configured using the one or more first capabilities supported by the access terminal and the one or more second capabilities supported by the apparatus, wherein the one or more first capabilities are received by the apparatus before the session is set up;

wherein the first and second authentication messages comprise extensible authentication protocol (EAP) messages; and wherein the apparatus comprises an Internet Protocol Gateway device ("IPG") disposed between the access terminal and the network.

14. An apparatus comprising:

means for determining, at the apparatus, one or more first capabilities supported by the apparatus during an authentication process with a network device comprising an Internet Protocol Gateway ("IPG") disposed between an access terminal and an Internet protocol ("IP") network, and wherein the one or more first capabilities comprise at least one of resource revocation capability, and robust header compression (ROHC) capabilities; and means for generating a first authentication message for access to a network, wherein information for the one or more first capabilities is included in the first authentication message;

wherein the first authentication message is sent to the network device;

wherein a second authentication message received at the apparatus includes information about one or more second capabilities supported by the network device, the second capabilities including at least one type of Internet protocol supported by the network;

wherein a session is configured between the network device and the apparatus using the one or more first capabilities supported by the apparatus and the one or more second capabilities supported by the network device, wherein the one or more first capabilities are sent before the session is set up; and wherein the first and second authentication messages comprise extensible authentication protocol (EAP) messages.

15. The method of claim 1, wherein the session is configured to support at least a part of the one or more first capabilities supported by the access terminal, wherein different first capabilities being supported by the access terminal result in different session configurations.

16. The apparatus of claim 7, wherein the session is configured to support at least a part of the one or more first capabilities supported by the access terminal, wherein different first capabilities being supported by the access terminal result in different session configurations.

* * * * *